(12) United States Patent
Hepp et al.

(10) Patent No.: US 8,931,435 B2
(45) Date of Patent: Jan. 13, 2015

(54) SELECTIVE ANIMAL FEEDER

(76) Inventors: Kenneth R. Hepp, Oconomowoc, WI (US); Thomas J. Green, West Bend, WI (US); Dennis P. Tronca, Grafton, WI (US); Roger V. Hajny, Cedarburg, WI (US)

( * ) Notice: Subject to any disclaimer, the term of this patent is extended or adjusted under 35 U.S.C. 154(b) by 1 day.

(21) Appl. No.: 13/210,940

(22) Filed: Aug. 16, 2011

(65) Prior Publication Data
US 2012/0037080 A1   Feb. 16, 2012

Related U.S. Application Data

(60) Provisional application No. 61/374,097, filed on Aug. 16, 2010.

(51) Int. Cl.
| | | |
|---|---|---|
| A01K 31/12 | (2006.01) | |
| A01K 39/01 | (2006.01) | |
| A01K 39/012 | (2006.01) | |

(52) U.S. Cl.
CPC .......... *A01K 39/0113* (2013.01); *A01K 39/012* (2013.01)
USPC ........................................ 119/57.9; 119/52.4

(58) Field of Classification Search
USPC ................ 119/51.01, 51.14, 52.1, 52.2, 52.3, 119/52.4, 55, 57.8, 57.9, 76
See application file for complete search history.

(56) References Cited

U.S. PATENT DOCUMENTS

| | | | | | |
|---|---|---|---|---|---|
| 3,011,476 | A | * | 12/1961 | Bell | 119/417 |
| 3,241,525 | A | * | 3/1966 | Meier | 119/55 |
| 4,834,025 | A | * | 5/1989 | Tum | 119/51.5 |
| 5,048,461 | A | * | 9/1991 | Wessner | 119/52.3 |
| 5,947,054 | A | * | 9/1999 | Liethen | 119/57.9 |
| 6,578,518 | B1 | * | 6/2003 | Conforti | 119/57.8 |
| 6,622,654 | B2 | * | 9/2003 | Fasino | 119/57.9 |
| 8,807,081 | B1 | * | 8/2014 | Gage et al. | 119/52.3 |

* cited by examiner

*Primary Examiner* — Rob Swiatek
*Assistant Examiner* — Lisa Tsang
(74) *Attorney, Agent, or Firm* — Michael Best & Friedrich LLP

(57) ABSTRACT

An animal feeder includes a feed bin configured to hold feed stock. The feed bin has a first feed port. The animal feeder also includes an outer housing positioned around at least a portion of the feed bin. The outer housing has a second feed port. The animal feeder further includes a magnet supported by one of the feed bin and the outer housing. The magnet magnetically couples the outer housing to the feed bin. The outer housing is movable relative to the feed bin between a first position, in which the outer housing is magnetically coupled to the feed bin such that the first feed port and the second feed port are at least partially aligned, and a second position, in which the outer housing is not magnetically coupled to the feed bin and the first feed port and the second feed port are out of alignment.

11 Claims, 9 Drawing Sheets

SELECTIVE ANIMAL FEEDER

CROSS-REFERENCE TO RELATED APPLICATIONS

This application claims priority to U.S. Provisional Application No. 61/374,097, filed Aug. 16, 2010, the entire contents of which are incorporated herein by reference.

FIELD OF THE INVENTION

The present invention relates to animal feeders. More particularly, the invention relates to bird feeders which allow smaller birds to feed, while preventing access to squirrels and larger "bully" birds.

SUMMARY

In one embodiment, the invention provides an animal feeder including a feed bin configured to hold feed stock. The feed bin has a first feed port. The animal feeder also includes an outer housing positioned around at least a portion of the feed bin. The outer housing has a second feed port. The animal feeder further includes a magnet supported by one of the feed bin and the outer housing. The magnet magnetically couples the outer housing to the feed bin. The outer housing is movable relative to the feed bin between a first position, in which the outer housing is magnetically coupled to the feed bin such that the first feed port and the second feed port are at least partially aligned, and a second position, in which the outer housing is not magnetically coupled to the feed bin and the first feed port and the second feed port are out of alignment.

In another embodiment, the invention provides an animal feeder including a housing configured to hold feed stock. The housing has a feed port. The animal feeder also includes a perch positioned adjacent the feed port. The perch is configured to support an animal to access the feed port. The animal feeder further includes a magnet magnetically coupling the perch to the housing. The perch magnetically uncouples from the housing and does not provide access to the feed port when a force is applied to the perch that exceeds a magnetic coupling force provided by the magnet.

In yet another embodiment, the invention provides an animal feeder including a housing configured to hold feed stock. The housing has a feed port. The animal feeder also includes a perch assembly pivotally coupled to the housing. The perch assembly includes a perch end and a counter-balance. The perch end extends from the housing adjacent the feed port to support an animal to access the feed port. The perch end pivots relative to the housing away from the feed port and does not provide access to the feed port when a force is applied to the perch end to lift the counter-balance.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
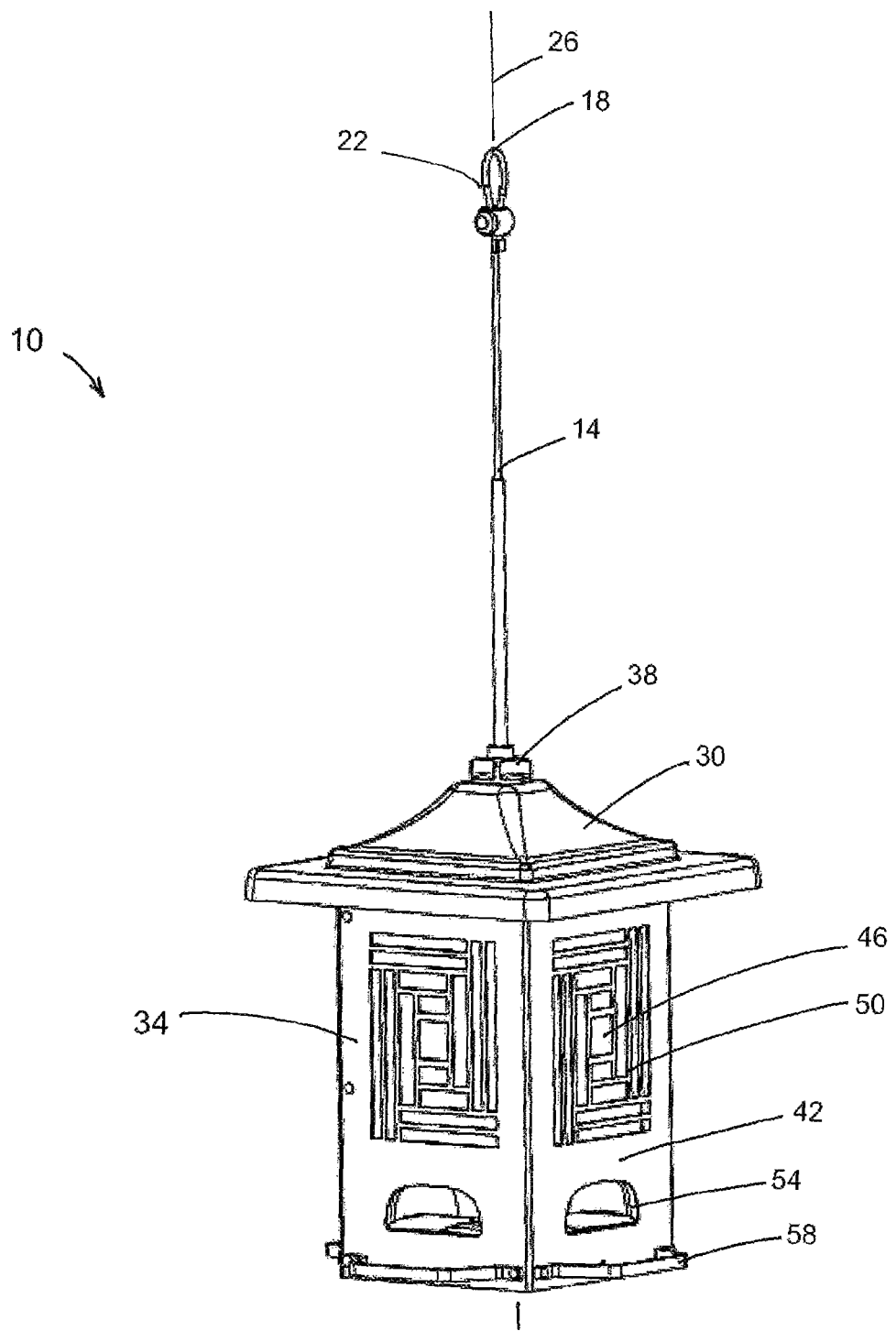
FIG. 1 is a perspective view of a bird feeder.

FIG. 1 is a perspective view of a bird feeder 10 according to some embodiments of the invention. The feeder 10 hangs from a support member 14, such as a cable, string, rope, or wire. The support member 14 has a first end 18 including a loop 22 such that the support member 14 may be hung from a tree, post, roof or the like. When hanging, the support member 14 lies along and defines a central axis 26 of the feeder 10.

The feeder 10 includes a roof 30 and an outer housing 34. The roof 30 is configured to prevent rain and snow from wetting feed stock, such as bird seed, within the outer housing 34. The roof 30 is further configured to deter squirrels and other nuisance animals from accessing the feeder 10 from above, such as by crawling or sliding down the support member 14. A roof locking nut 38 selectively secures the roof 30 in place. The roof locking nut 38 may be loosened in order to remove the roof 30 when refilling or cleaning the feeder.

In the illustrated embodiment, the outer housing 34 has a substantially square cross-section relative to the axis 26, with four vertical faces 42 when the feeder 10 is hanging in a position of use. It should be appreciated, however, that in other embodiments, the outer housing 34 may have circular, triangular, pentagonal, hexagonal and other cross-sections with corresponding numbers of vertical faces.

Each vertical face 42 of the outer housing 34 includes an outer viewing window 46 for observing a level of feed within the feeder 10. In the illustrated embodiment, the outer viewing windows 46 have a decorative pattern 50 to increase the aesthetic appeal of the feeder 10. An outer feed port 54 is positioned below the outer viewing window 46 on each vertical face 42. Adjacent each outer feed port 54, a feed perch 58 is coupled to the outer housing 34. The perch 58 is configured to support a bird or other animal on the feeder 10 to access feed through the feed port 54. In the illustrated embodiment, there is one outer viewing window 46 on each vertical face 42, one outer feed port 54 below each viewing window 46, and one feed perch 58 adjacent each outer feed port 54. In other embodiments, other combinations, numbers, and configurations of viewing windows, feed ports and perches are envisioned, all of which are within the scope of the present invention. Some embodiments may omit the outer viewing windows and/or perches altogether.

Figure 2:
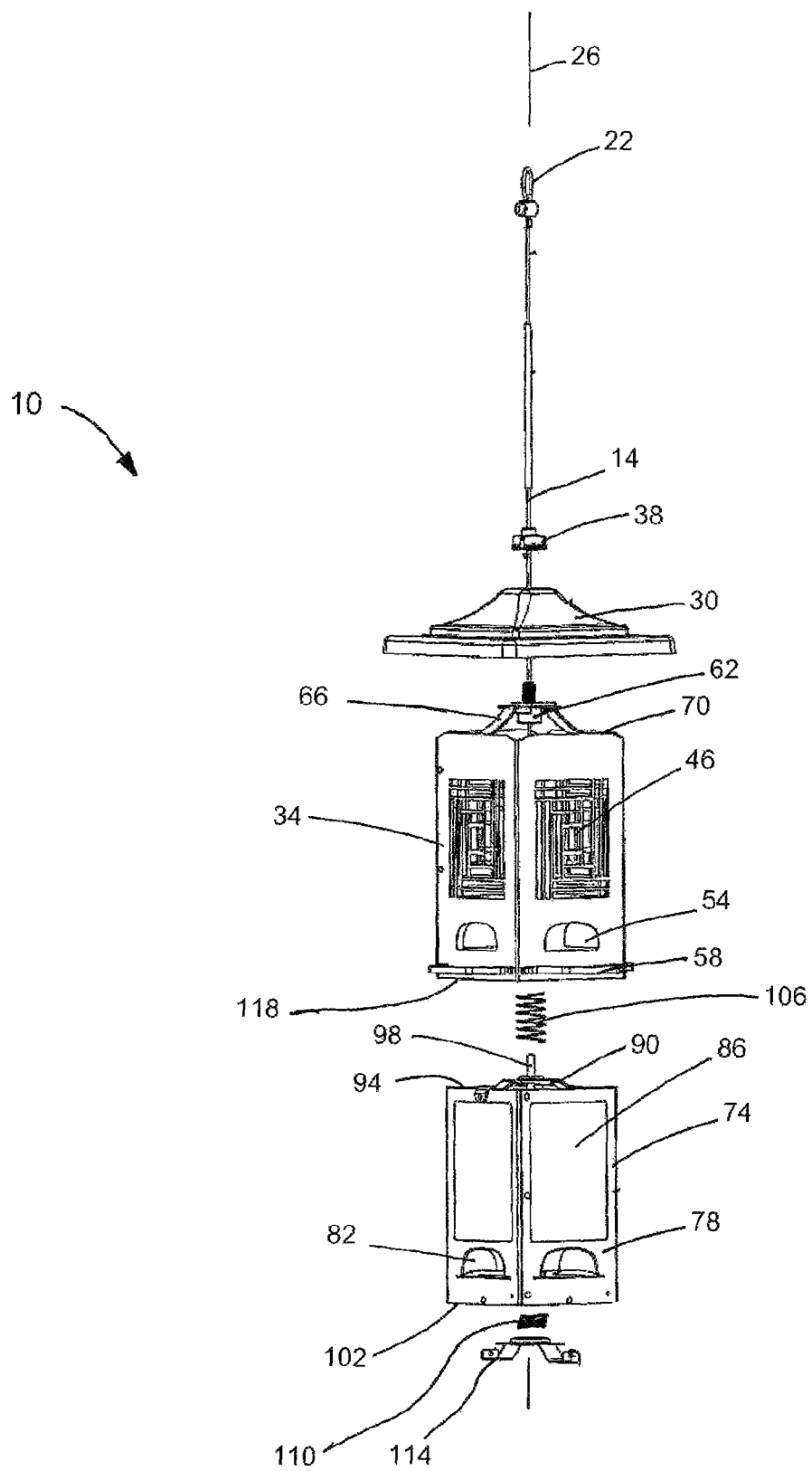
FIG. 2 is an exploded view of the bird feeder of FIG. 1.

FIG. 2 is an exploded view of the feeder 10. The roof 30 is held in position between the roof nut 38 and a spring adjuster 62. The spring adjuster 62 is coupled to a spring mount 66. The spring mount 66 is, in turn, coupled to a first end 70 of the outer housing 34. In a position of use, the first end 70 is an upper end of the outer housing 34.

A feed bin 74 is disposed within the outer housing 34. The feed bin 74 is configured for holding a volume of feed stock, such as sunflower seeds, thistle seeds, or other seeds and grains. In the illustrated embodiment, the feed bin 74 has four faces 78, to match the number of vertical faces 42 of the outer housing 34. Each face 78 of the feed bin 74 has an inner feed port 82. In the illustrated embodiment, each face 78 also has a feed bin window 86. When assembled, the feed bin windows 86 are substantially aligned with the outer viewing windows 46.

A crossbar 90 is coupled to a first end 94 of the feed bin 74. A guide rod 98 is disposed along the axis 26 from the cross bar 90 through the feed bin 74 from the first end 94 to a second end 102. A resilient member, in this case a compression spring 106, is disposed along the axis 26 between the spring adjuster 62 of the outer housing 64 and the crossbar 90 of the feed bin 74. A magnet 110 is disposed between the second end 102 of the feed bin 74 and a bottom magnet strap 114. The bottom magnet strap 114 is coupled to second end 118 of the outer housing 34. Thus, when assembled, the first end 70 of the outer housing 34 is biased away from the first end 94 of the feed bin 74 by the compression spring 106. The second end 118 of the outer housing 34 is selectively, magnetically coupled to the second end 102 of the feed bin 74.

Figure 3:
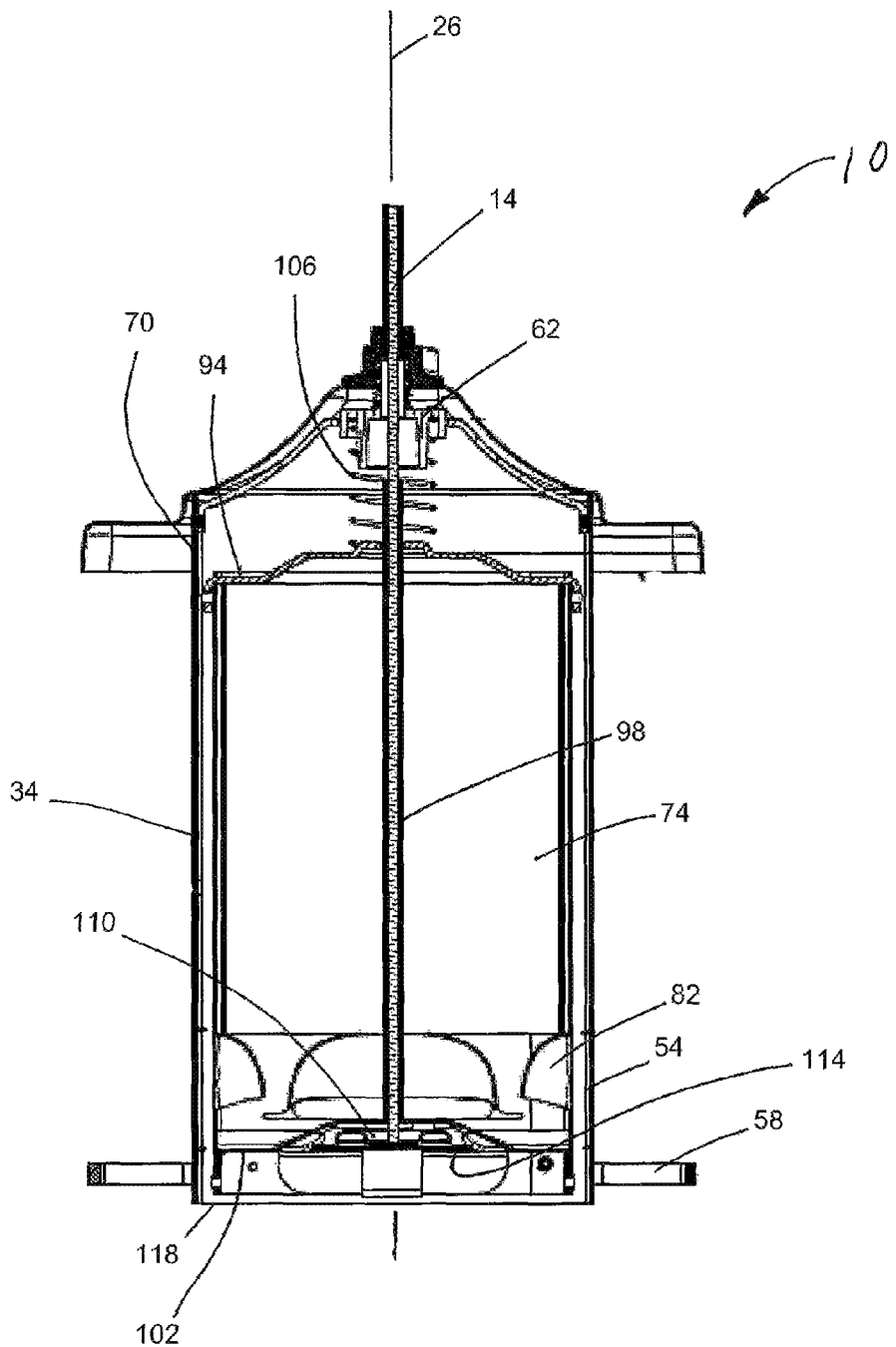
FIG. 3 is a cross-sectional view of the bird feeder of FIG. 1 in a first condition.

FIG. 3 is a cross-section of the feeder 10 in a first condition. In the first condition, the outer housing 34 is in a first position relative to the feed bin 74 such that feed within the feed bin 74 is accessible to birds or the like by alignment of the outer feed ports 54 and the inner feed ports 82. The second end 118 of the outer housing 34 is magnetically coupled to the second end 102 of the feed bin 74, and the first end 70 of the outer housing 34 is resiliently biased apart from the first end 94 of the feed bin 74 by the compression spring 106. As also illustrated in FIG. 3, the support member passes through the feeder 10 and is coupled to the feed bin 74 at the second end 102. The support member 14 passes through the guide rod 98 along the axis 26. In a position of use, such as when hanging from a tree or roof, the feed bin 74 remains stationary relative to the support member 14. So long as magnetic contact is maintained between the second end 102 of the feed bin 74 and the magnet strap 114 at the second end 118 of the outer housing 34, the outer housing 34 remains stationary relative to the feed bin 74, and the inner feed ports 82 remain aligned with the outer feed ports 54.

Figure 4:
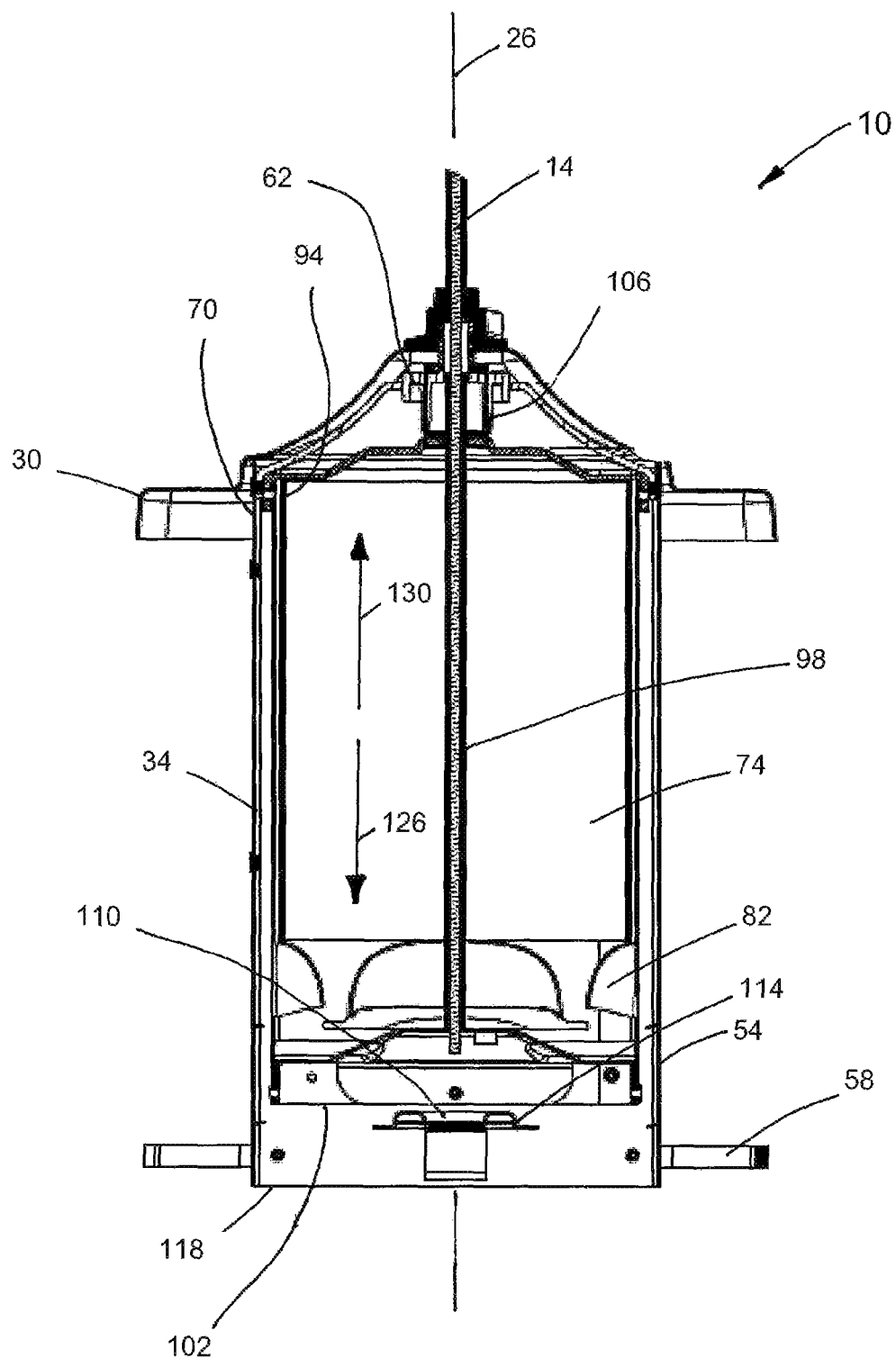
FIG. 4 is a cross-sectional view of the bird feeder of FIG. 1 in a second condition.

FIG. 4 is a cross-section of the feeder 10 in a second condition. When the total weight, or force, applied to the outer housing 34 exceeds a magnetic coupling force provided by the magnet 110 (such as when a squirrel stands on one of the perches 58), the outer housing 34 becomes uncoupled from the feed bin 74 and moves to a second position. However, the outer housing 34 remains biased toward the first position by the compression spring 106.

In the second condition, the outer housing 34 has translated linearly in a first direction 126 (downward, in a position of use) along the axis 26 relative to the feed bin 74 and the support member 14, such that the outer feed ports 54 are no longer aligned with the inner feed ports 82. In this condition, a squirrel, or other animal of sufficient weight to overcome the magnetic coupling force, can no longer access the feed stock. Once sufficiently discouraged, the squirrel will likely jump off of the feeder 10. Once the squirrel's weight is no longer applied to the outer housing 34, the compression spring 106 biases the outer housing 34 in a second direction 130 (upward, in a position of use) along the axis 26 until the magnet 110 again makes contact with the second end 102 of the feed bin 74.

It should also be appreciated that the relative positions of various components within the feeder 10 may be rearranged. For example, the magnet 110 may positioned anywhere within the feeder 10, such as on the feed bin 74 or adjacent the first end 70, so long as the function of coupling the outer housing 34 to the feed bin 74 is preserved. In some embodiments, a portion of the outer housing 34 and/or a portion of the feed bin 74 may be magnetized to define the magnet 110. Likewise, the compression spring 106 may be repositioned so long as the biasing function is preserved. In other embodiments, a coil extension spring, leaf spring, or other resilient member may be used in place of the compression spring 106 to bias the outer housing 34.

Although the present invention has been described on the scale of a bird feeder configured to prevent access by squirrels, the invention may be scaled up or down for other applications. For example, the feeder may be scaled up for use as a selective deer feeder that prevents access to standing or hanging bears. A feeder may also be scaled down for use as a selective butterfly feeder that prevents access to all birds.

In still other embodiments, the concept of magnetic coupling in combination with spring biasing may be applied to individual perches, rather than the whole feeder. Feeding ports may be individually closed by a respective sliding door or cover. The doors may work on a pulley system activated when an outer housing moves up or down, or the doors may be slidably coupled to the exterior of a fixed housing. In still other embodiments, the perches may be pivotally, magnetically coupled to a housing. When a squirrel or large bird stands on the perch, the perch pivots away from the housing. When the squirrel or large bird falls off or leaves, the perch is biased back to its original position.

Figure 5:
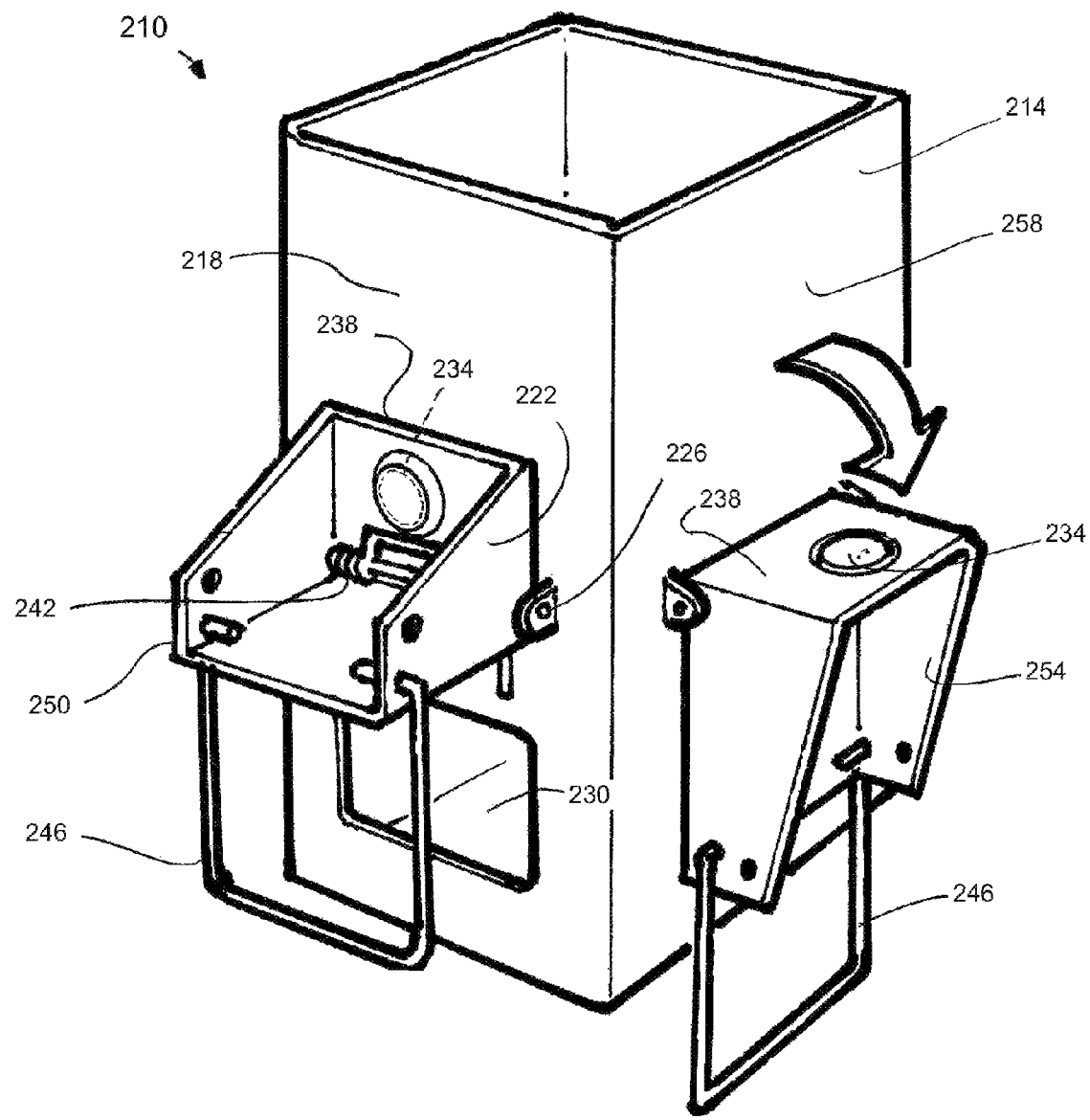
FIG. 5 is a perspective view of a bird feeder with multiple pivoting perches according to another aspect of the invention.

FIG. 5 illustrates an embodiment of a feeder 210 with individually, pivotally coupled perches. In the embodiment of FIG. 5, an outer housing 214 also serves as a feed bin. Although not illustrated, a roof similar to the roof 30 of FIGS. 1-4 would normally be in place. On a first vertical face 218, a first awning 222 is pivotally coupled to the outer housing 214 about a first pivot axis 226. A feed port 230 is disposed below the first awning 222. The feed port 230 provides access to feed held with the outer housing 214. The first awning 222 is magnetically coupled to the first vertical face 218 via a magnet 234 on a back face 238 of the awning 222. A torsion spring 242, or other biasing member, disposed about the axis 226 biases the first awning 222 against the first vertical face 218. A first perch 246 is pivotally coupled to a distal end 250 of the first awning 222. When a small, lightweight bird, for example, lands on the perch, the magnet 234 provides a sufficient magnetic coupling force to maintain the awning 222 in a horizontal orientation.

If, for example, a squirrel or other animal of sufficient weight stands on the perch 246, the weight or force applied to the perch 246 is sufficient to overcome the magnetic coupling force of the magnet 234. A second awning 254 on a second vertical face 258 illustrates the result. The second awning 254 is configured similar to the first awning 222, with a magnet 234 on a back face 238, a torsion spring 242 (not visible), and a perch 246 pivotally coupled to a distal end 250. The back face 238 of the second awning 254 has pivoted away from the second vertical face 258 and now covers a corresponding feed port (not visible), blocking access to the port. When the squirrel subsequently jumps from the perch 246, the torsion spring 242 will bias the awning 254 back to the horizontal position. Thus, the embodiment of FIG. 5 provides selective access to the feed ports 230, and automatically resets once a squirrel or other nuisance animal has left the perch 246.

Figure 6:
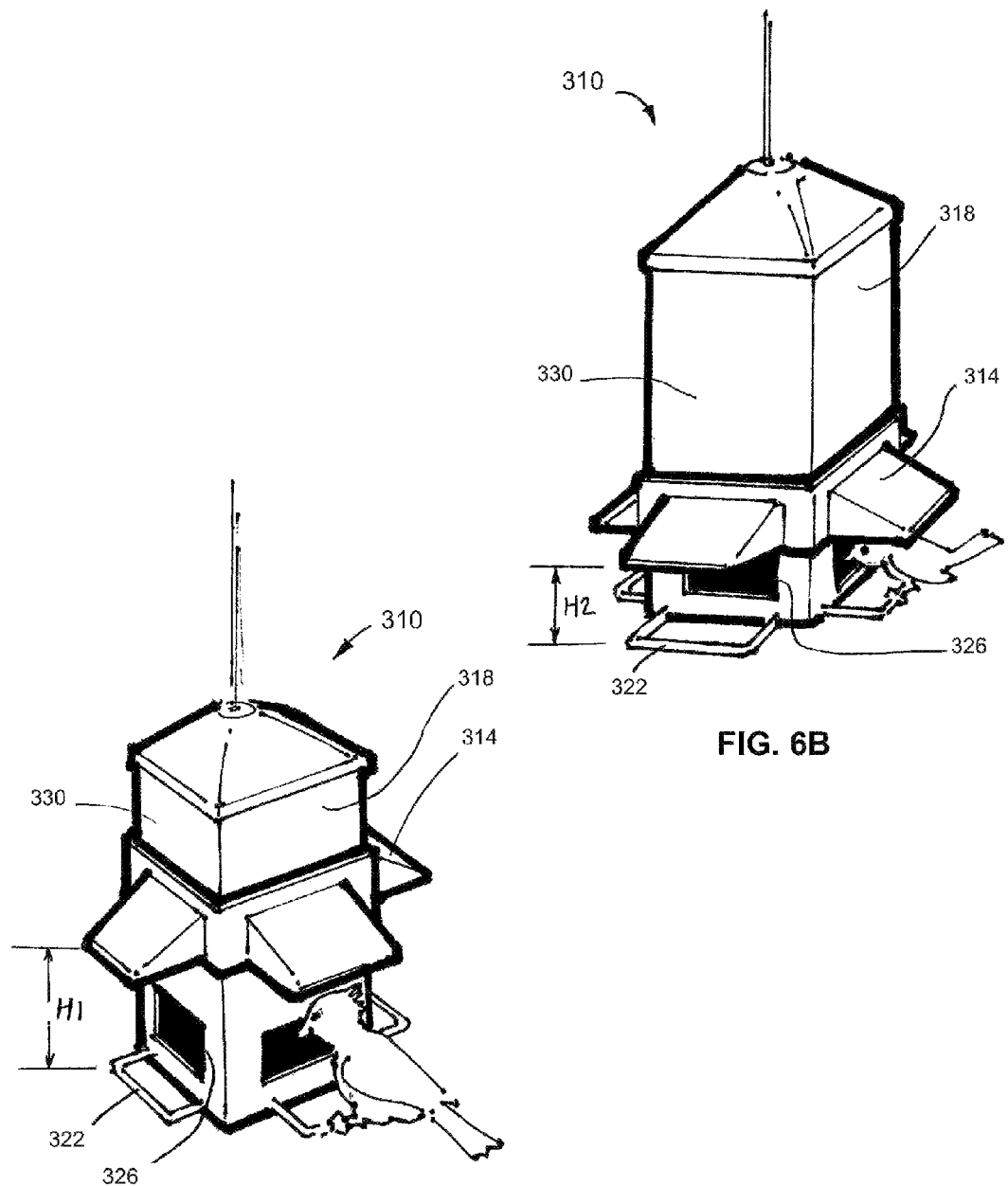
FIG. 6A is a perspective view of a bird feeder with a height-adjustable awning at a first height according to yet another aspect of the invention.
FIG. 6B is a perspective view of the bird feeder of FIG. 6A with the height-adjustable awning at a second height.

FIGS. 6A and 6B illustrate a feeder 310 according to another aspect of the invention. In this embodiment, an adjustable awning 314 is slidably coupled circumferentially about an outer housing 318. The outer housing 318 has a perch 322 and a feed port 326 on each of four vertical faces 330. A height H of the adjustable awning 314 relative to the perches 322 may be manually adjusted to limit the size of a bird that may access feed through the feed ports 326. As shown in FIG. 6A, at a first height H1, the adjustable awning 314 is configured to allow access to the feed ports 326 to larger birds, such as the illustrated blue jay. As shown in FIG. 6B, at a second height H2, the adjustable awning 314 is configured to allow access to the feed ports 326 only to smaller birds. In the position of FIG. 6B, larger birds are unable to access the feed ports 326 because the awning 314 obstructs them. The illustrated adjustable awning 314 may be fixed in a particular position by various means, including a friction fit, magnets, pins, set screws and others.

Figure 7:
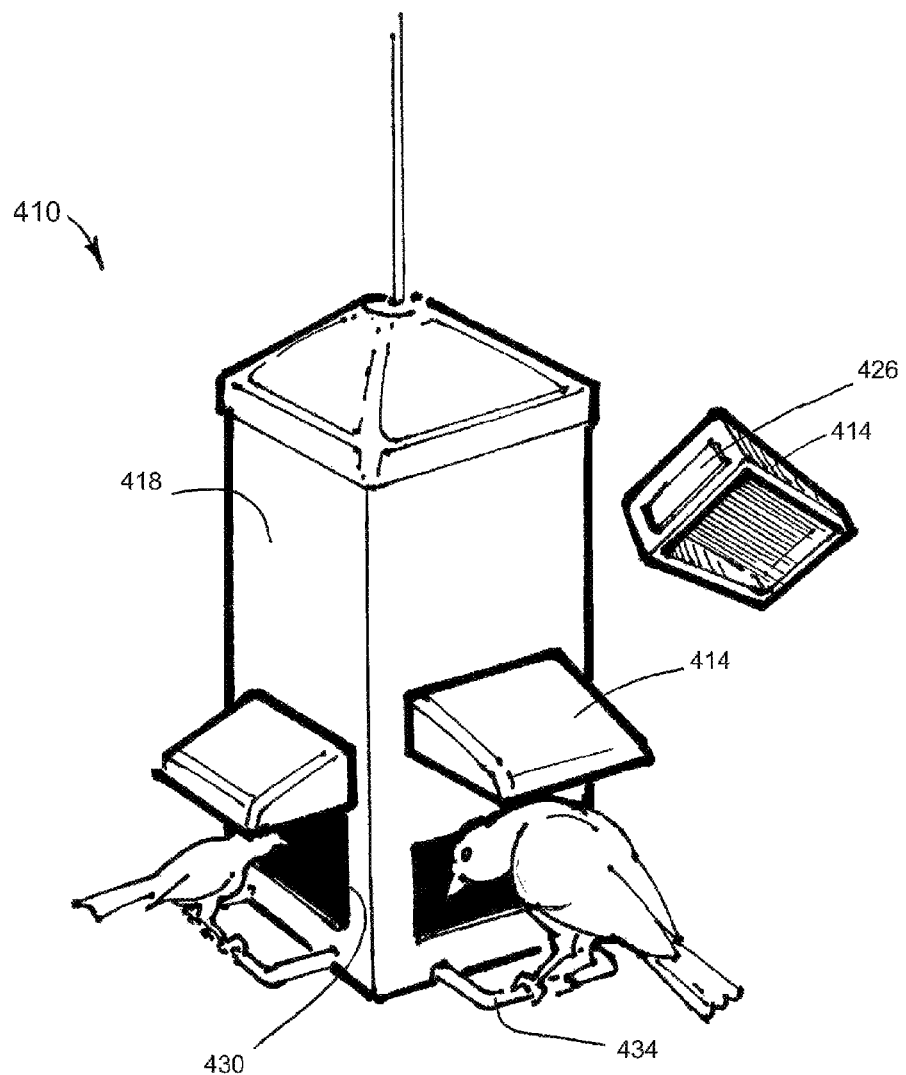
FIG. 7 is a perspective view of a bird feeder with multiple, magnetically coupled awnings according to still another aspect of the invention.

FIG. 7 illustrates a bird feeder 410 according to yet another aspect of the invention. In this embodiment, multiple awnings 414 are provided. Each awning 414 is independently magnetically and detachably coupled to a vertical face 418 of an outer housing 422 via a magnet 426. A user may manually select a position for each awning 414 in order to limit the size of birds which have access to a particular feed port 430 while standing on a respective feed perch 434.

Figure 8A:
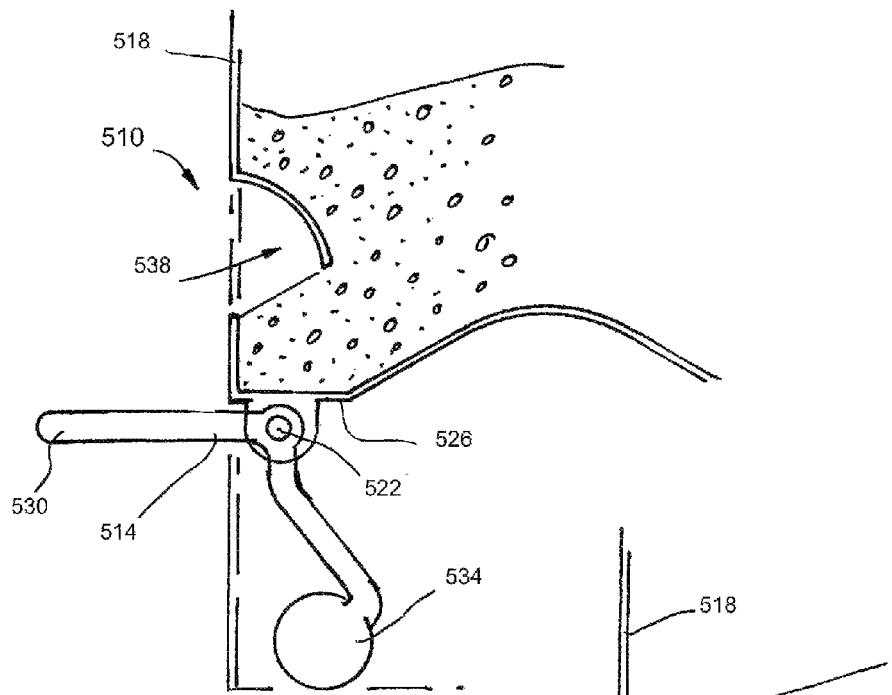
FIG. 8A is a cutaway view of a bird feeder with a counter-balanced perch in a first position according to yet another aspect of the invention.
Figure 8B:
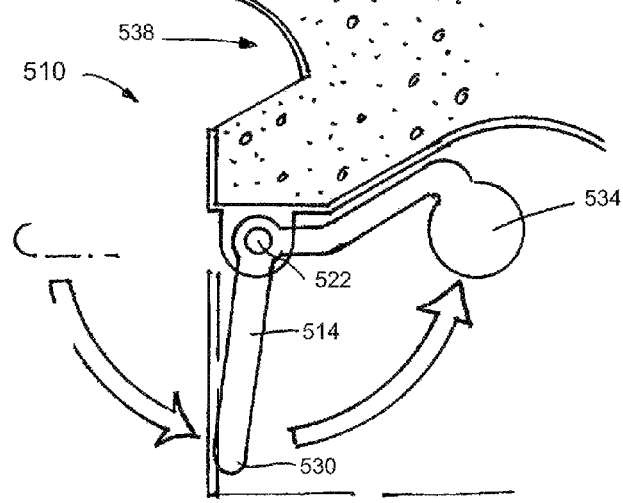
FIG. 8B is a cutaway view of the bird feeder of FIG. 8A with the counter-balanced perch in a second position.

FIGS. 8A and 8B are partial cutaway views of a bird feeder 510 according to yet another aspect of the invention. In this embodiment, a perch assembly 514 is pivotally coupled to an outer housing 518 about a pivot axis 522. In the illustrated embodiment, the pivot axis 522 is positioned on a bottom portion 526 of the outer housing 518, although in other embodiments, the pivot axis 522 may be positioned on a vertical face or other surface. The perch assembly 514 includes a perch end 530 and a counter-balance 534. The perch assembly 514 is formed as a unitary member such that a position of the perch end 530 relative to the counter-balance 534 remains fixed, regardless of the position or orientation of the perch assembly 514 relative to the housing 518. In the position illustrated in FIG. 8A, the perch end 530 is positioned such that a small bird may have access to a feed port 538 of the outer housing 518. Due to gravity, the counter-balance 534 remains generally below the pivot axis 522 so long as a weight of the bird standing on the perch end 530 does not provide sufficient torque about the pivot axis 522 to lift the counter-balance 534 (e.g., so along as a force applied to the perch end 530 is not sufficient to lift the counter-balance 534).

FIG. 8B illustrates the effect of a squirrel, of other animal of sufficient weight, standing on the perch end 530. The weight of the squirrel may, depending on the size of the counter-balance 534, be sufficient to rotate the perch assembly 514 such that the perch end 530 no long provides access to the feed port 538. When the squirrel jumps off of the perch end 530, the counterbalance 534 pivots the perch assembly 514 to return to the position illustrated in FIG. 8A. As with other aspects of the invention, the counter-balance and other components may be scaled up or down for specific applications and animal sizes.

Figure 9:
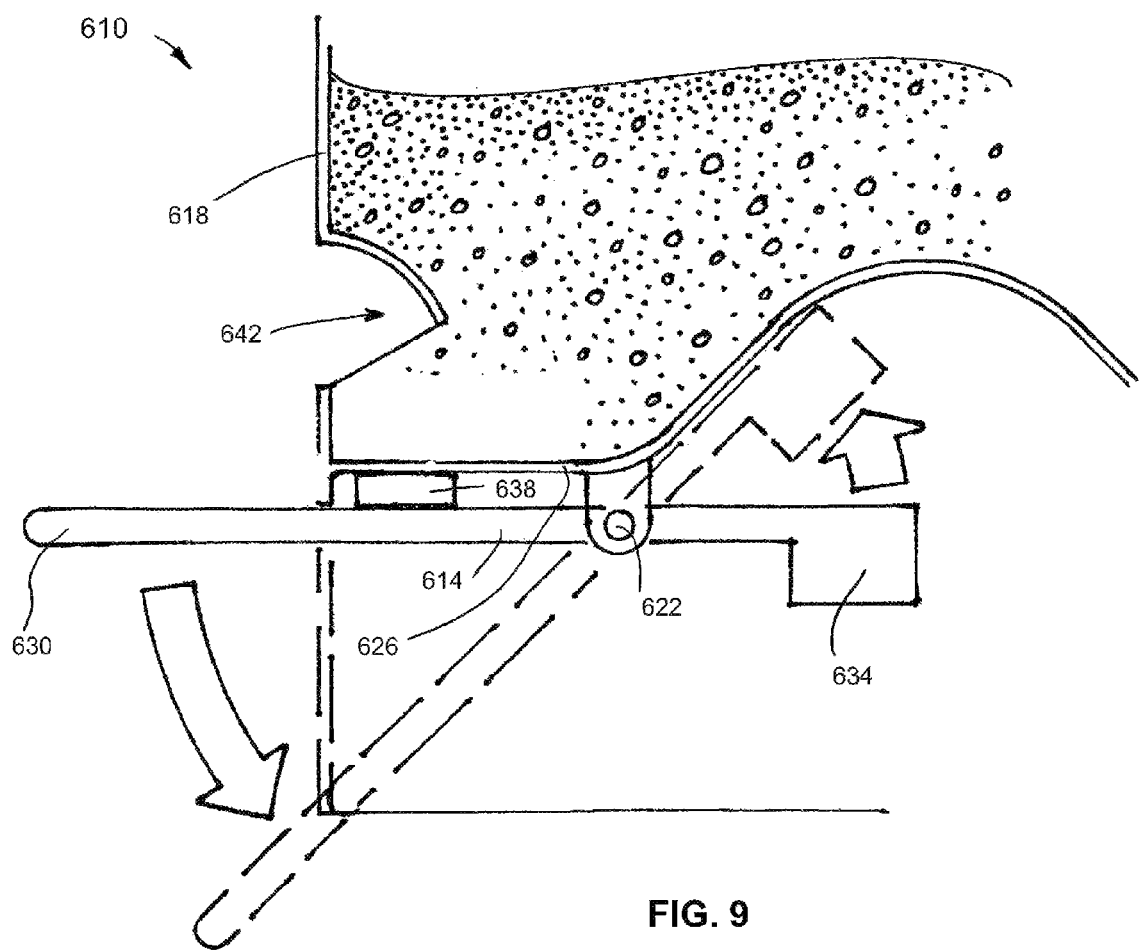
FIG. 9 is a cutaway view of a bird feeder with a magnetic, counter-balanced perch according to still yet another aspect of the invention.

FIG. 9 is a partial cutaway view of a bird feeder 610 according to yet another aspect of the invention. In this embodiment, a perch assembly 614 is pivotally coupled to an outer housing 618 about a pivot axis 622. In the illustrated embodiment, the pivot axis 622 is positioned on a bottom portion 626 of the outer housing 618. The perch assembly 614 includes a perch end 630 and a counter-balance 634. Unlike the embodiment of FIGS. 8A-8B, the feeder 610 also includes a magnet 638 fixedly coupled to the bottom portion 626 of the outer housing 618. When the perch assembly 614 in a horizontal position, a portion of the perch end 630 is magnetically coupled to the magnet 638. The magnetic coupling force provides a breakaway threshold for the perch assembly 614: light birds, for example, will not provide sufficient force on the perch end 630 to break the magnetic coupling. A squirrel, however, may apply sufficient force to the perch end 630 to exceed the magnetic coupling force provided by the magnet 638 and, thereby, break the magnetic coupling. Once the magnetic coupling has been broken, the perch assembly 614 is free to pivot about the pivot axis 622 such that the perch end 630 no longer provides access to a feed port 642. Once the squirrel jumps from the perch assembly 614, the counterbalance 634 causes the perch assembly 614 to return to the horizontal position and re-couple to the magnet 638.

It should be appreciated that the various features associated with the embodiments of FIGS. 1-9 may be variously combined within the scope of the invention.

Thus, the invention provides, among other things, an apparatus and method for selective access to an animal feeder. Various features and advantages of the invention are set forth in the following claims.

The invention claimed is:

1. An animal feeder comprising:
   a housing configured to hold feed stock, the housing having a feed port;
   a perch positioned adjacent the feed port, the perch configured to support an animal and to provide access to the feed port;
   a magnet magnetically coupling the perch to the housing, wherein the perch magnetically uncouples from the housing and does not provide access to the feed port when a force is applied to the perch that exceeds a magnetic coupling force provided by the magnet; and
   a biasing member fixed to the perch to bias the perch into engagement with the magnet.

2. The animal feeder of claim 1, wherein the perch is also pivotably coupled to the housing, and wherein the perch pivots away from the feed port when the perch magnetically uncouples from the housing to inhibit access to the feed port.

3. The animal feeder of claim 2, wherein the biasing member automatically pivots the perch back toward the feed port after the force is removed from the perch.

4. The animal feeder of claim 1, further comprising an awning coupled to the housing adjacent the feed port, wherein the perch is supported by the awning.

5. The animal feeder of claim 4, wherein the magnet is supported on one of the awning and the housing to magnetically couple the awning to the housing, and wherein the awning magnetically uncouples from the housing when the force is applied to the perch.

6. The animal feeder of claim 5, wherein the awning is also pivotably coupled to the housing, and wherein the awning pivots relative to the housing and substantially blocks access to the feed port when the awning magnetically uncouples from the housing.

7. An animal feeder comprising:
   a housing configured to hold feed stock, the housing having a feed port; and
   a perch assembly pivotably coupled to the housing, the perch assembly including a perch end and a counterbalance, the perch end extending from the housing adjacent the feed port to support an animal, thereby providing access to the feed port;

wherein the perch end pivots relative to the housing away from the feed port and does not provide access to the feed port when a force is applied to the perch end to lift the counter-balance, the feed port remains motionless relative to the housing as the perch end pivots; and wherein the perch assembly is a unitary member such that a position of the perch end relative to the counter-balance is fixed.

8. The animal feeder of claim 7, wherein the counter-balance automatically pivots the perch end back toward the feed port after the force is removed from the perch end.

9. The animal feeder of claim 7, wherein the perch assembly is pivotably coupled to the housing at a pivot axis, and wherein the counter-balance is positioned generally below the pivot axis when the force is not applied to the perch end.

10. The animal feeder of claim 7, further comprising a magnet supported on one of the housing and the perch assembly, wherein the perch end is magnetically coupled to the housing adjacent the feed port, and wherein the perch end magnetically uncouples from the housing when the force applied to the perch end exceeds a magnetic coupling force provided by the magnet.

11. The animal feeder of claim 7, wherein the perch assembly is pivotably coupled to a bottom portion of the housing.

\* \* \* \* \*